United States Patent Office 2,806,382
Patented Sept. 17, 1957

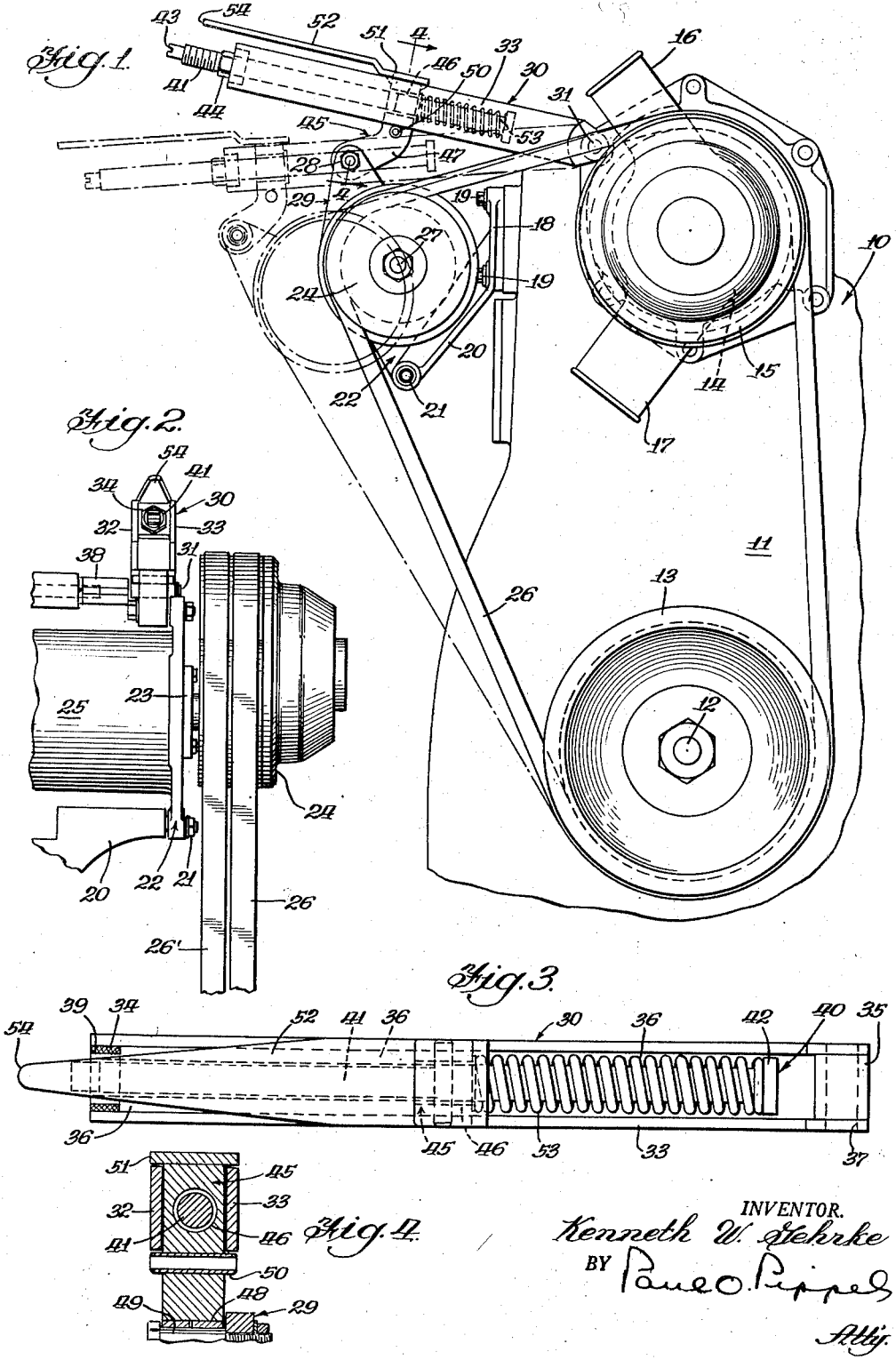

2,806,382

BELT TENSIONING DEVICE

Kenneth W. Gehrke, Des Plaines, Ill., assignor to International Harvester Company, a corporation of New Jersey Application June 1, 1956, Serial No. 588,699

6 Claims. (Cl. 74—242.11)

This invention relates to an adjustable belt tensioning device for maintaining a predetermined tension of a belt in driving relation with a plurality of pulleys and the like. More in particular this invention relates to a belt tensioning device of low cost construction and provides means for ascertaining by visual inspection the degree of belt stretching resulting from prolonged service.

Particularly in connection with automotive type internal combustion engines which is a highly competitive industrial field where the cost factor is exceedingly important, means for properly maintaining the tension of belts for driving pumps, generators, fans, etc., from the engine are usually omitted. The prolonged use of belts in such applications causes eventual stretching which if not properly compensated results in high wear due to excessive slippage and even breakage of the belt. Thus, a loosened belt causes improper functioning of the driven parts and where breakage of the belt occurs the engine becomes inoperable which in the case of road breakdown is extremely expensive.

There are designs of belt tensioning devices heretofore known. One known type provides for automatic tensioning of the belt but the construction is expensive and therefore impractical to use in connection with the highly competitive automotive engine. Other non-automatic tensioning devices of lesser expensive construction requires excessive space for adaptation to the compact requirements of automotive engines. The prime object of this invention is to provide a controlled resilient belt tensioning device of low cost construction which also is compact and easily adapted to automotive power plants.

A further object of this invention is to provide a resilient belt tensioning device having adjustable means for maintaining the tension of the belt within a predetermined range.

A still further object of this invention is to provide a belt tensioning device having an indicator whereby one may by visual inspection observe the amount of lengthening or stretching that the belt may have acquired during prolonged usage.

Other and further important objects of this invention will become apparent from the ensuing description of a preferred embodiment, the appended claims and the accompanying drawings wherein:

Figure 1 is a front end view of an internal combustion engine of the automotive type illustrating the belt tensioning device of this invention in the initially adjusted position and, in dotted lines, the assumed position after prolonged service of the belt.

Figure 2 is a side view of the tensioning device of this invention illustrating additional details.

Figure 3 illustrates the construction of the carrier member and certain components associated therewith.

Figure 4 is a sectional view taken on the line 4—4 of Figure 1 illustrating the construction details of the movable element associated with the carrier member.

With continued reference to the drawing, the numeral 10 (Figure 1) represents an internal combustion engine comprising the usual engine block 11. The protruding extension of the crankshaft 12 of the engine 10 has a drive pulley 13 keyed to the shaft 12 for rotation therewith in a conventional manner. On the upper portion of the block 11 is mounted the usual combination assembly of a coolant water pump 14 and cooling fan (not shown). A driven pulley 15 is journaled for driving the water pump 14 and fan so that rotation of the pulley 15 causes the pump 14 and fan to function in a well-known manner. The tubes 16 and 17 are the inlet and outlet means associated with the pump 14.

A stationary mounting bracket 18 is rigidly connected to the upper portion of the block 11 by any conventional means such as bolts 19. A leg portion 20 of the bracket 18 protrudes outwardly and preferably downwardly from the mounting connection to the block 11. Adjacent the outer end of the leg portion 20 of the bracket 18 is a pivotal mounting connection 21 for a bearing member generally indicated at 22. The bearing member 22 is provided with a bearing 23 for supporting rotatably an idler pulley 24. Although not forming a part of this invention, the idler pulley 24 may be for convenience connected to the shaft of an electric generator 25 whereby the bearing member 22 may be incorporated as the front bearing member of the generator 25. Thus during operation the idler pulley 24 may serve as a driving means for the generator 25. From Figures 1 and 2 it will be apparent that the bearing member 22 which may include the generator 25 may move arcuately about the pivot mounting 21.

In order to connect the drive pulley 13 with the driven pulley 15 and idler pulley 24 in driving relation a belt 26 is disposed about peripheral portions of the pulleys 13, 15 and 24, as best shown in Figure 1. The conventional V-belt is quite suitable for such purpose provided that the pulleys are grooved to fit the contour of the belt 26. Obviously a plurality of belts 26 may be employed with suitably grooved pulleys for parallel driving relation. A second such belt is shown at 26'.

The bearing member 22, it will be seen from Figures 1 and 2, extends from the pivotal connection 21 upwardly and outwardly to include the axis of rotation of shaft 27 of the idler pulley 24 and beyond to a pivotal connection 28 for a purpose to be described later. It will be noted here, however, that at least a portion of the bearing member 22 between the pivotal connections 21 and 28 forms a moment arm generally indicated at 29 about the pivot connection 21. Thus an arcuate movement of the moment arm 29 about the pivot 21 causes a corresponding arcuate movement of the shaft 27, generator 25 and pulley 24.

An elongated carrier member generally indicated at 30 is pivotally mounted at 31 to the engine block 11, as best shown in Figure 1. The pivotal connections at 21, 28 and 31 are positioned in alinement with each other so that the bearing member 22 and the carrier member 30 may move arcuately in substantially the same vertical plane formed by the three aforesaid pivotal connections.

The carrier member 30 may conveniently be comprised of a pair of rectangular shaped metal brackets 32 and 33 spaced apart in parallel relation forming a track means by the relationship of their respective lengthwise edges. Spacer elements 34 and 35 are disposed at the respective ends of the carrier member 30, as best shown in Figure 3. The spacer elements 34 and 35 are connected rigidly to the respective ends of the brackets 32 and 33 such as by welding to form a hollow portion 36 within the carrier member 30. The spacer element 35 is provided with a transverse bore 37 adapted to journal on a stub shaft 38. The stub shaft 38 is rigidly mounted on the engine block 11. Thus the bore 37 of the spacer 35 forms the pivotal connection 31 with the stub shaft 38 mounted on the block 11.

The spacer element 34 is provided with a longitudinal threaded bore 39, as best shown in Figure 3. A bolt generally indicated at 40 having a threaded shank 41 is fitted threadedly into the threaded bore 39. The head 42 of the bolt 40 may be circular or provided with facets provided, however, that the maximum cross-section of the head 42 is not large enough to engage the brackets 32 and 33 to prevent axial rotation of the bolt 40. The outer end of the shank 41 of the bolt 40 is provided with wrench engageable means such as a slot 43 adapted for engagement with a screw driver for adjustably rotating the bolt 40 axially. A lock-nut 44 may be provided on the outer end threaded portion of the shank 41 to engage in locking relation with the spacer element 34 to prevent the axial rotation of the bolt 40 thereby maintaining an adjusted position of the bolt 40 with respect to the carrier member 30.

On the shank 41 of the bolt 40 within the hollow portion 36 of the carrier member 30 is disposed a movable element generally indicated at 45. The movable element 45 is provided with a bore 46 slightly larger in diameter than the shank 41 so that the movable element is in slidable relation with respect to the bolt 40. The element 45 is constructed of a generally rectangular shape in cross-section so that it may slide non-rotatably along the bolt 40 between the brackets or track means 32 and 33, as best illustrated in Figures 1, 3 and 4. The lower portion of the movable element 45 is provided with a depending leg 47 rigidly connected thereto. The leg 47 may be angularly disposed, as illustrated in Figure 1. The lower end portion of the leg 47 is provided with a transverse bore 48. A short rod 49 is inserted through the bore 46 and removably connected to the moment arm 29 in relation to form the pivot connection 28.

Now in order to maintain the movable element 45 in slidable relation with the track means 32 and 33, guide means are provided. To accomplish this the lower portion of the element 45 is provided with a removable transverse pin 50 extending on each side of the element 45 adapted to engage the underside edges of the track means 32 and 33 in slidable relation, as best shown in Figures 1 and 4. The upper portion of the movable element 45 is provided with a plate 51, which may for convenience be removable, of sufficient width to overlap the upper edges of the track means 32 and 33 in slidable relation, as best illustrated in Figures 1 and 4. The plate 51 may be extended outwardly to form a pointer or indicator needle 52 for a purpose to be described later.

A suitable helical spring 53 is disposed on the shank of the bolt 40, as illustrated in Figure 3. One end of the spring 53 may be anchored on the bolt head 42 and the other end is in engaged relation with the movable element 45 in compressed relation adapted to urge the element 45 in an outward direction.

Having the above construction of the invention in mind, the operation thereof will now be described in detail.

*Operation*

In order to loosen the idler pulley 24 and the associated belt tensioning device of this invention for inserting the belt 26 about the pulleys 13, 15 and 24, the lock-nut 44 is first loosened. The bolt 40 is then rotated in a direction to recede further within the hollow portion 36 of the carrier member 30 thus relaxing the compressive effort of the spring 53. The slot 43 at the extreme outer end of the shank of the bolt 40 is adapted to receive an ordinary screw driver to accomplish the rotation of the bolt 40. The bearing member 22 with its associated idler pulley 24 may then be moved arcuately about the pivot 21 to a limited degree without compressing the spring 53. The belt 26 may then be easily slipped into the grooves of the pulleys 13, 15 and 24.

After the belt 26 has been positioned on the pulleys 13, 15 and 24, the bolt 40 is then rotated in the opposite direction from that described above, thus shortening the distance between the bolt-head 42 and the movable element 45 and thereby engaging the spring 53 compressively. The selection of the spring 53 should be commensurate with the tension desired of the belt 26. When the bolt 40 has been rotated sufficiently to cause the compression of spring 53 to urge the movable element 45 and the associated moment arm 29, bearing member 22 and pulley 24 outwardly for tensioning the belt 26 to the desired amount, the lock-nut 44 is tightened to maintain the bolt 40 fixedly in the adjusted position. The extreme outward end 54 of the indicator needle 52 will now assume a position with reference to the extreme outer end of the shank of the bolt 40, as best shown in solid lines of Figure 1.

Now the continued usage of the belt 26 will gradually cause it to lengthen or stretch. As this stretching of the belt 26 progressively occurs, the idler pulley 24, bearing member 22 and the carrier member 30 with the movable element 45 will approach the position shown in dotted lines of Figure 1. In this latter position it will be noted that the movable element 45 has moved outwardly on the track means 32 and 33 of the carrier member 30 and the end 54 of the indicator needle 52 has correspondingly moved outwardly with reference to the extreme outward end of the shank of the bolt 40. The gauging of the distance of movement of the end 54 of the needle 52 with respect to the outer end of the shank of the bolt 40 during the service of the belt 26 serves as a means of determining when the bolt 40 should again be adjusted. In practice it has been found that for ordinary automotive engines a relative movement of the needle 52 with respect to the bolt 40 of about one inch is tolerable before re-adjustment of the bolt 40 becomes necessary. This, of course, is based on the selection of the length and compressive characteristics of the spring 53 considering the overall length of the carrier member 30 and the bolt 40. In any event, the selection of the spring 53 should be such that its compressive characteristics between the range of initial adjustment and re-adjustment should be within the tolerable limits required for proper tensioning of the belt 26.

Having thus described an embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A belt tensioning device for tensioning a belt in driving relation with a plurality of pulleys comprising a rotatable idler pulley, a pivotally mounted bearing member supporting said idler pulley, a moment arm rigidly connected to said bearing member, an elongated carrier member, one end of said carrier member being pivotally mounted remotely from said pivotal mount of said bearing member, said carrier member having a hollow portion disposed between the ends thereof, the other end of said carrier member having an axially disposed threaded first bore, a bolt threadedly fitted into said first bore, the head portion of said bolt being positioned in said hollow portion of said carrier member, means for adjustably rotating said bolt in said threaded first bore, locking means engageable with said bolt to prevent rotation thereof, a non-rotatable axially movable element supported by said carrier member and disposed in the hollow portion thereof, a second bore disposed in said movable element in substantial axial alinement with said first bore, said bolt extending through said second bore in slidable relation; an indicator needle mounted on the upper end of said movable element, said indicator needle extending in the direction of said other end of said carrier member in parallel relation with respect to said bolt, a leg rigidly connected to and depending from said movable element, laterally disposed guide means rigidly connected to the lower portion of said movable element adapted to engage the carrier member in sliding relation, a helical spring disposed on said bolt, one end of said spring being in an abutting relation with the head of said bolt and the other end being engaged with said movable element in compressed relation for urging said movable element in an outward direction from said pivotal mounting connection of said carrier member, the lower end of said leg of said movable element being pivotally connected to the upper portion of said moment arm whereby said idler pulley is urged in a direction opposite to the pivotal mounting connections of said bearing member and said carrier member thereby engaging said idler pulley with said belt at a predetermined tension.

2. A belt tensioning device for tensioning a belt in driving relation with a plurality of pulleys comprising a rotatable idler pulley, a pivotally mounted bearing member supporting said idler pulley, a moment arm rigidly connected to said bearing member, a carrier member, one end of said carrier member being pivotally mounted remotely from said pivotal mount of said bearing member, said carrier member having a hollow portion disposed between the ends thereof, a threaded first bore axially disposed in the other end of said carrier member, a bolt threadedly fitted into said first bore, the head portion of said bolt being positioned in said hollow portion of said carrier member, means for adjustably rotating said bolt in said first bore, locking means engageable with said bolt to prevent rotation thereof, a non-rotatable axially movable element supported by said carrier member, a second bore disposed in said movable element in substantial axial alinement with said first bore, said bolt extending through said second bore in slidable relation, a leg rigidly connected to and depending from said movable element, laterally disposed guide means rigidly connected to said movable element adapted to engage the carrier member in sliding relation, resilient means disposed on said bolt, one end of said resilient means being in an abutting relation with the head of said bolt and the other end being engaged with said movable element in compressed relation for urging said movable element in an outward direction from said pivotal mounting connection of said carrier member, the lower end of said leg of said movable element being pivotally connected to the upper portion of said moment arm whereby said idler pulley is urged in a direction opposite to the pivotal mounting connections of said bearing member and said carrier member thereby engaging said idler pulley with said belt at a predetermined tension.

3. A belt tensioning device for tensioning a belt in driving relation with a plurality of pulleys comprising a rotatable idler pulley, a pivotally mounted bearing member supporting said idler pulley, a moment arm rigidly connected to said bearing member, a carrier member, one end of said carrier member being pivotally mounted remotely from said pivotal mount of said bearing member, said carrier member having a hollow portion disposed between the ends thereof, a threaded first bore axially disposed in the other end of said carrier member, a bolt threadedly fitted into said first bore, the head portion of said bolt being positioned in said hollow portion of said carrier member, means for adjustably rotating said bolt in said first bore, a non-rotatable axially movable element supported in slidable relation by said carrier member, a second bore disposed in said movable element in substantial axial alinement with said first bore, said bolt extending through said second bore in slidable relation, a leg rigidly connected to and depending from said movable element, laterally disposed guide means rigidly connected to said movable element adapted to engage the carrier member in slidable relation, resilient means associated with said bolt, said resilient means being adapted to urge said movable element in a direction outwardly from said pivotal mounting connection of said carrier member, the lower end of said leg of said movable element being pivotally connected to the upper portion of said moment arm whereby said idler pulley is urged in a direction outwardly from said pivotal mounting connections of said bearing member and said carrier member thereby engaging said idler pulley with said belt at a predetermined tension.

4. A belt tensioning device for tensioning a belt in driving relation with a plurality of pulleys comprising a rotatable idler pulley, a pivotally mounted bearing member supporting said idler pulley, a carrier member having track means disposed between the ends thereof, one end of said carrier member being pivotally mounted remotely from said pivotal mount of said bearing member, a threaded first bore axially disposed in the other end portion of said carrier member, a bolt threadedly fitted into said first bore, the head portion of said bolt being positioned adjacent said track means of said carrier member, means for adjustably rotating said bolt in said first bore, a movable element disposed on and supported by said carrier member and adapted to move slidably on said track means of said carrier member, a second bore disposed in said movable element in substantial axial alinement with said first bore, said bolt extending through said second bore in slidable relation, laterally disposed guide means rigidly connected to said movable element adapted to engage the track means of said carrier member in slidable relation, means connecting pivotally said movable element with said bearing member, and resilient means supported by said bolt and adapted to urge said movable element in a direction outwardly from said pivotal mount connections of said carrier member and said bearing member whereby said idler pulley is urged in a direction for engaging said idler pulley with said belt at a predetermined tension.

5. A belt tensioning device for tensioning a belt in driving relation with a plurality of pulleys comprising a rotatable idler pulley, a pivotally mounted bearing member supporting said idler pulley, a carrier member pivotally mounted at one end thereof, said carrier member having track means disposed between the ends thereof, a first bore axially disposed in the other end portion of said carrier member, a bolt disposed in said first bore, means for rigidly supporting said bolt in said first bore in longitudinal adjustable relation with respect to said carrier member, the head portion of said bolt being positioned adjacent said track means of said carrier member, a movable element disposed on and supported by said carrier member and adapted to move slidably on said track means of said carrier member, a second bore disposed in said movable element in substantial axial alinement with said first bore, said bolt extending through said second bore in slidable relation, laterally disposed guide means rigidly connected to said movable element adapted to engage the track means of said carrier member in slidable relation, means connecting pivotally said movable element with said bearing member, and resilient means supported by said bolt and adapted to urge said movable element in a direction outwardly from said pivotal mount connections of said carrier member and said bearing member whereby said idler pulley is urged in a direction for engaging said idler pulley with said belt at a predetermined tension.

6. A belt tensioning device for tensioning a belt in driving relation with a plurality of pulleys comprising a rotatable idler pulley, a pivotally mounted bearing member supporting said idler pulley, a carrier member pivotally mounted at one end thereof, said carrier member having track means disposed between the ends thereof, a first bore axially disposed in the other end portion of said carrier member, a bolt disposed in said first bore, means for rigidly supporting adjustably said bolt in said first bore in parallel relation with respect to said track means of said carrier member, the head portion of said bolt being positioned adjacent said track means of said carrier member, a movable element disposed on said carrier member and adapted to move slidably on said track means of said carrier member, a second bore disposed in said movable element, said bolt extending through said second bore in slidable relation, means connecting pivotally said movable element with said bearing member, and resilient means associated with said movable element and carrier member adapted to urge said movable element in a direction outwardly from said pivotal mount connections of said carrier member and said bearing member whereby said idler pulley is urged in a direction for engaging said idler pulley with said belt at a predetermined tension.

References Cited in the file of this patent
UNITED STATES PATENTS

| | | |
|---|---|---|
| 2,368,848 | Krueger | Feb. 6, 1945 |
| 2,480,294 | Hume | Aug. 30, 1949 |
| 2,726,364 | Merritt | Dec. 6, 1955 |